June 30, 1970  W. C. TAMBUSSI  3,518,338
MOLDING PROCESS
Original Filed June 8, 1964
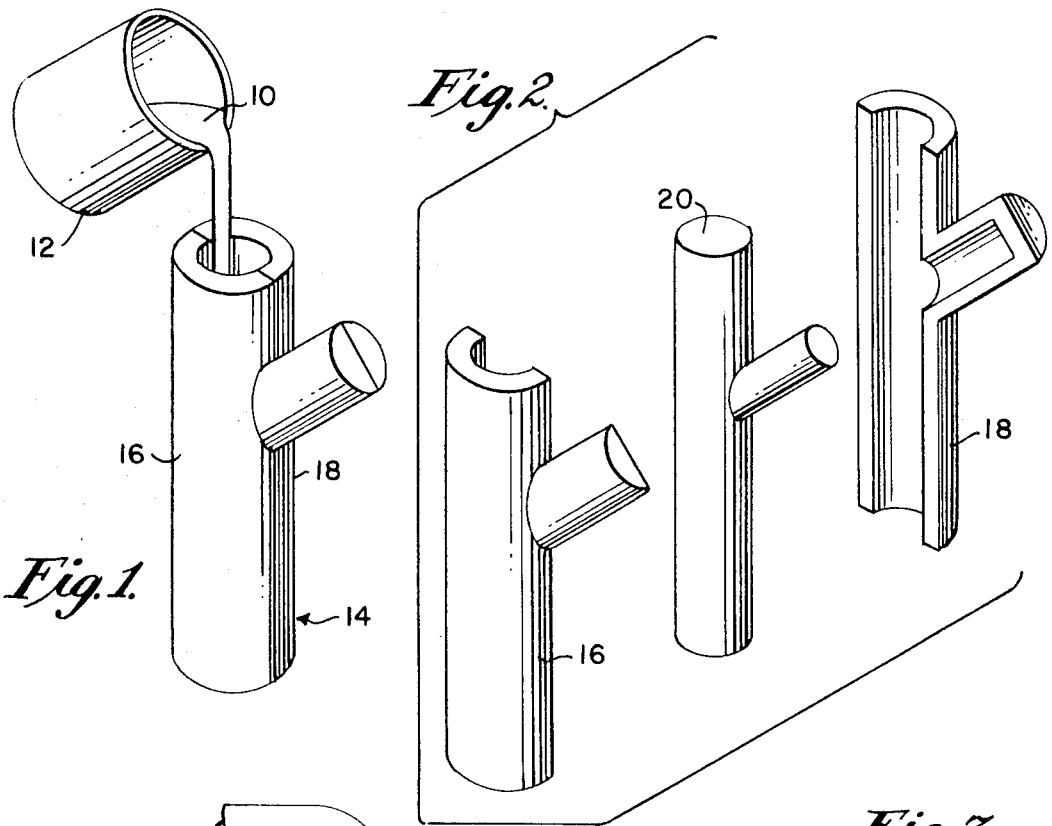
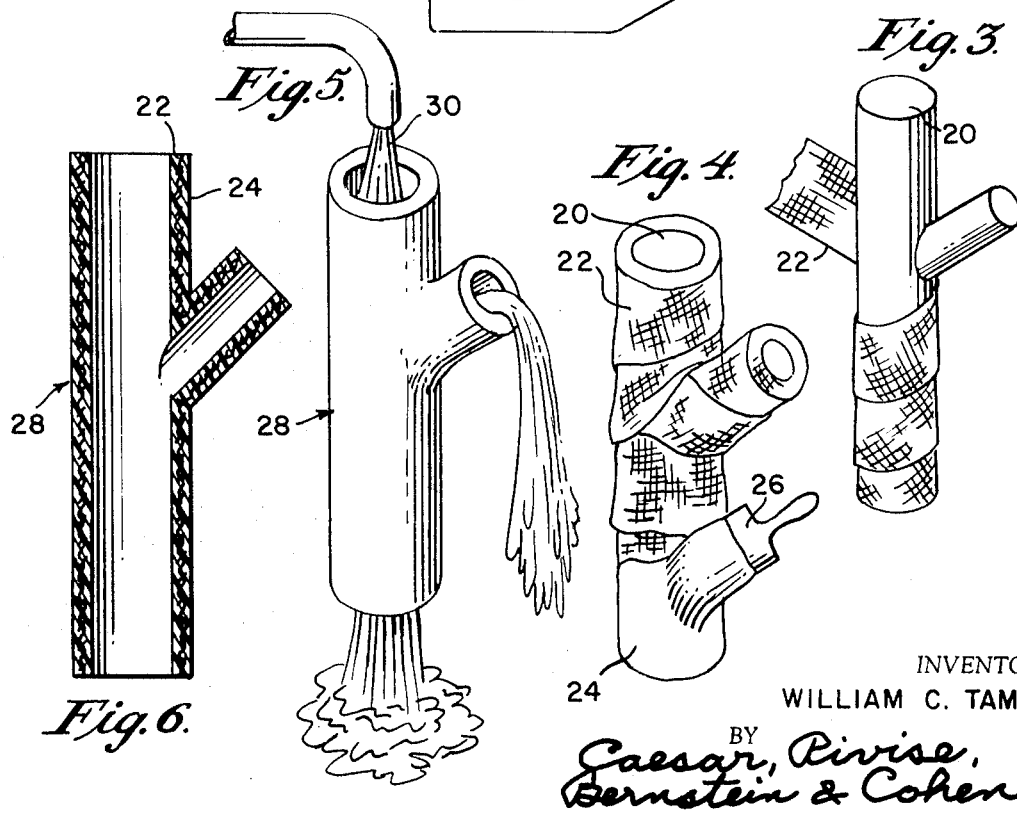
INVENTOR.
WILLIAM C. TAMBUSSI
BY Caesar, Rivise,
Bernstein & Cohen
ATTORNEYS.

od known in the art, such as by application with a brush 26, as shown in FIG. 4. Other coating methods that can be used are spray coating and dip coating.

The applied resin is then cured either at room temperature or in an oven, as the case may be with respect to the particular resin. Once the resin is cured the mandrel is then removed. One of the features of this invention is the fact that the mandrel is soluble in water and is easily washed out and dissolved with warm water. Thus, as seen in FIG. 5, the mandrel is removed by spraying the interior of molded article 28 which has been formed on the mandrel with water 30. After the mandrel has been removed, the molded article will have an interior size and shape which is identical to the exterior size and shape of the mandrel, as seen in FIG. 6.

The composition used to make the mandrels of this invention comprises a water solution of the reaction product of calcium sulfate anhydrite and ammonium alum. This composition is poured into a mold and permitted to set. Total setting time is about fifteen minutes. The molded composition will be completely hard in about one hour.

After the composition has hardened the mold is removed. The mandrel can then be placed on a shelf and permitted to stay there indefinitely, since it will not crumble and does not absorb water. Whenever it is desired to use it, the mandrel formed from the composition can be used in molding various articles having interior sizes and shapes which are identical to the exterior sizes and shapes of the mandrel.

EXAMPLE 1

A mandrel is formed by placing four pounds of water in a container and adding two pounds of ammonium alum to the water. The water is heated to boiling and the ammonium alum is soon completely dissolved in the water. After the ammonium alum has been dissolved, ten ounces of terra alba are added and stirred until the flakes are completely dissolved. Thereafter, the solution of the water, ammonium alum and terra alba is poured into a mold of the desired configuration. A mold similar to that shown at 14 in FIG. 1 can be used. When the composition is completely hard to the touch, it is released from the mold. It is to be noted as set forth at the end of this example that the term "terra alba" as used in this specification means a substance containing essentially only calcium sulfate anhydrite. As used herein the term "terra alba" excludes all other substances which are not operative in the applicant's invention.

In the molding process no release agent is necessary for the mold, since the mandrel is water soluble, and additionally, has no residual tackiness.

The mandrel is then wrapped with fiber glass mesh and a coating of epoxy resin is applied thereon. Additional laminations of fiber glass and epoxy resin are applied until the desired thickness is reached. The epoxy resin can be applied by any of the methods well known to the art. In this example, it is brushed on as shown in FIG. 4.

After the laminations have been completed and the resin cured, the mandrel is then washed out with water. The water can be tap water at a temperature of 130° F. to 150° F. The finished part is then ready for use.

During the washing out process, the mandrel will be dissolved in the water. The solution can then be reclaimed, and more solids added in order to reuse the material in making new mandrels.

In the foregoing example, English terra alba was used as the source of calcium sulfate anhydrite. English terra alba is substantially pure calcium sulfate anhydrite, and has the following breakdown:

| Compound: | Percentage |
| --- | --- |
| $CaSO_4$ | 99.92 |
| $MgO$ | .02 |
| $CaCO_3$ | .06 |

Fineness: 99½% through 325 mesh.

EXAMPLE 2

The ammonium alum and English terra alba of Example I are again dissolved in heated water by the same method and in the same proportions of Example I. The solution is then molded into long cylindrical rods. The rods are placed in abutting relationships within concrete forms and concrete is poured thereover. Once the concrete has hardened, warm water under pressure is forced against the ends of the cylindrical rods formed from the composition of this invention which are exposed at the edges of the concrete. The water will eventually wash the composition out of the concrete, thereby leaving a cylindrical path through the concrete. In this way, concrete can be provided with channels therethrough for the purpose of circulating warm water or other media, as desired. Thus, the concrete can be provided with these channels for the purpose of circulating hot water, thereby melting any snow which may form thereon.

An alternative method of forming the mandrel used in this example is to pour the mandrel composition into an elongated flexible plastic tube. Thereafter the tube is shaped into the desired configuration for the channel in the concrete. When the mandrel has solidified, the plastic tube is then cut, and the finished cylindrical mandrel is then of the desired configuration for forming a continuous channel through the concrete.

In the foregoing examples, the water, ammonium alum and terra alba were in proportions, by weight, of 6.4: 3.2:1, respectively. Thus the water comprises about 60% of the solution and the solids about 40% of the solution. The ammonium alum comprises 76% of the solids and 30% of the solution and the terra alba (calcium sulfate anhydrite) comprises 24% of the solids and 10% of the solution. These are the optimum proportions from the standpoint of each for dissolving the solids, obtaining maximum strength, and maximum solubility of the final product. However, these proportions can be varied while still obtaining satisfactory results.

The minimum amount of water which is necessary is that which would be sufficient to dissolve the solids. The maximum amount of water that can be used is that which will still permit the dissolved solids to set, thereby obtaining a solid. However, it should be noted, that the greater the amount of water, the lower the compressive strength and density of the final mandrel. Thus, the amount of water can vary from one-half part of water to three parts of solids to a maximum of about eight parts water to three parts solid. Based on percentage of total solution, this is a range of about 14% water to 72.5% water, respectively.

The amount of calcium sulfate anhydrite used is dependent upon the desired strength of the final product. Thus, although the ammonium alum will solidify from a water solution, it will not have any substantial degree of strength. The greater the amount of terra alba mixed with the ammonium alum, the greater the strength of the final product. The minimum amount of calcium sulfate which may be used is one part by weight per eight parts by weight of ammonium alum. This is a percentage of approximately 11% of calcium sulfate based on the total weight of the solid. Therefore the maximum amount of ammonium alum present by weight of total solids is 89%.

The ammonium alum serves two functions. The first is to solidify the calcium sulfate when it is mixed with the water. Thus the calcium sulfate anhydrite will not set when dissolved in water. However, it will set when it is mixed with the ammonium alum and the two are dissolved in water. The second function of the ammonium alum is to solubilize the final molded mandrel. Thus the lower the amount of ammonium alum, the more difficult it is to wash out the mandrel after the final molding process. The lowest amount of ammonium alum which may be used is two parts of ammonium alum per five United States Patent Office 3,518,338
Patented June 30, 1970

3,518,338
MOLDING PROCESS
William C. Tambussi, 366 Monroe Ave.,
Cherry Hill, N.J. 08034
Original application June 8, 1964, Ser. No. 373,199, now Patent No. 3,364,039, dated Jan. 16, 1968. Divided and this application Nov. 28, 1967, Ser. No. 686,240
Int. Cl. B29c 1/02, 1/08
U.S. Cl. 264—221
5 Claims

ABSTRACT OF THE DISCLOSURE

A method of forming articles by molding hardenable material around a mandrel. The mandrel comprises the reaction product of calcium sulfate anhydrite and ammonium alum, and the mandrel is removed from the hardenable material by dissolving the mandrel in a solvent therefor.

This application is a division of application Ser. No. 373,199, filed June 8, 1964, now U.S. Pat. No. 3,364,039.

This invention relates to a method of forming molded articles, and more particularly, to a molding method wherein a hardenable material is placed around a mandrel and the mandrel is removed after the material has hardened leaving the molded article.

Various items having specific internal sizes and shapes, such as ducts and pressure vessels, are currently made by molding these items around a removable mandrel. One type of mandrel currently being used is formed of metal and is collapsible. The main disadvantage of this type of mandrel is that it is very costly. Another type of mandrel currently being used is one that is molded of plaster. There are a number of disadvantages to this type of mandrel. Included in these disadvantages are the high cost in view of the fact that a substantial amount of time is required to make the mandrel, the extensive time required to thoroughly dry the plaster mandrel, and the high labor cost and difficulty of removing the mandrel once the final product has been formed thereon. Thus when the mandrel is no longer needed, it must be chipped and broken out by hand.

Mandrels formed from the composition of this invention overcome all of the disadvantages of the collapsible metal mandrels and the break-away plaster mandrels of the prior art. In addition, mandrels formed from the composition of this invention enjoy many advantages not obtainable by the prior art mandrels.

The composition of this invention is formed into a mandrel by substantially the same method as that used to form plaster mandrels. Thus, the composition is poured into a two-piece metal mold and permitted to solidify. Once solidification has occurred, the metal mold is removed. After being permitted to harden, the mandrel is ready for use. The composition solidifies in approximately ten to fifteeen minutes and completely hardens in about one hour. This can be compared with a solidification time of thirty-five minutes for the plaster mandrels and a subsequent oven drying time of approximately one day. Mandrels formed from the composition of this invention dry at room temperature.

Another advantage of the composition of this invention is the ease of removal of the mandrels from the products molded thereon. Thus, the mandrels are easily removed by merely dissolving them in warm water. After the mandrels have been dissolved out, the solution can be reclaimed and reused in making additional mandrels.

Another feature of the composition of this invention is that the mandrels formed therefrom have an extensive shelf life. This is because the mandrels will not absorb moisture. Additionally, the mandrels can be cut, filed and sanded. The mandrels have no residual tackiness, and for this reason, no release agent is necessary on the molds in which the mandrels are formed, or on the mandrels when molding the final article thereon.

It is therefore an object of this invention to provide a novel molding composition.

It is another object of this invention to provide a novel removable mandrel and method for its use.

It is a further object of this invention to provide a novel molding composition that can be formed into a mandrel which requires no oven curing.

It is a further object of this invention to provide a novel molding mandrel having a smooth surface with no residual tackiness.

It is a further object of this invention to provide a molding mandrel that has an extensive shelf life.

It is a further object of this invention to provide a novel method of molding articles having predetermined interior sizes and shapes.

These and other objects of this invention are accomplished by providing a molding composition comprising calcium sulfate anhydrite and ammonium.

In another aspect of the invention there is provided a method of forming articles having a predetermined interior shape comprising forming a mandrel comprising the reaction product of calcium sulfate anhydrite and ammonium alum, molding hardenable material around said mandrel and removing said mandrel by dissolving it in a solvent therefor.

Other objects and many of the attendant advantages of this invention will be readily appreciated as the same becomes better understood by reference to the following detailed descriptions when considered in connection with the accompanying drawings wherein:

FIG. 1 shows the method of forming the mandrel from the composition of this invention;

FIG. 2 shows the method of removing the mandrel from its mold;

FIG. 3 shows the method of wrapping a reinforcing fabric around the mandrel;

FIG. 4 shows the method of impregnating resin into the reinforcing fabric;

FIG. 5 shows the method of removing the mandrel from the resin impregnated fabric after the resin has hardened; and FIG. 6 is a sectional view of the final product molded on the mandrel of this invention.

Referring now in greater detail to the various figures of the drawings wherein similar reference characters refer to similar parts, the first step of forming a mandrel from the composition of this invention is shown in FIG. 1. The composition is shown at 10 in FIG. 1 in its liquid form. Composition 10 is poured from a vessel 12 into a mold 14 comprising a pair of releasable halves 16 and 18.

The composition is permitted to set and harden in the mold, which takes about one hour. After it has hardened, halves 16 and 18 of the mold are separated, leaving the hardened composition in the form of mandrel 20. Mandrel 20 is configured in size and shape to the interior dimensions desired from a molded article.

In many cases the molded article formed on mandrel 20 will be reinforced, such as with a fiber glass fabric or mesh. Thus, as seen in FIG. 3, prior to forming a molded article on mandrel 20, the mandrel is wrapped with fiber glass web 22. Thereafter the fiber glass is impregnated and coated with a resinous composition 24. The composition can be any of the well known film forming resins, such as nylon, epoxy, polyester, silicone, and di-isocyanate resins. The only requirement for the resin is that it be insoluble in water. The fiber glass can be impregnated and coated with these resins by any methparts of calcium sulfate anhydrite. On a percentage basis this is approximately 29% by weight of alum of the total solid. Thus, the upper limit for the calcium sulfate anhydrite is 71%.

The exact mechanism which makes the composition of this invention react in the manner that it does is not known. It has been observed though that pure calcium sulfate anhydrite, although soluble in water, will not set on standing. However, when the ammonium alum and the calcium sulfate are both dissolved in water, the mixture will set. It is therefore believed, that there is a reaction between the ammonium alum and the calcium sulfate in water. Even though the mixture will set in water, it can still be redissolved by the supplying of large volumes of water. The dissolving can be accomplished by either cold or warm water, but the warm water is preferred since it expedites the dissolving process.

In each of the above examples, the alum is first dissolved in the boiling water. Then the terra alba is added. It has been found that by dissolving the materials in this manner, the solution can be obtained far more quickly. Thus, although the terra alba and ammonium alum could be pre-mixed and then dissolved in water, it has been found that the dissolving process takes longer when using the pre-mixed materials.

After the mandrel has been dissolved out of the final molded product, the solution obtained from the dissolving water and the mandrel can be reused. However, additional ammonium alum and terra alba must be added in order to bring the final concentration of the solids in the solution to a point whereby the solids will set.

Although the composition of this invention consists essentially of the calcium sulfate and ammonium alum, optional ingredients may be added if desired. Thus, small amounts of pigment can be added to the composition in order to color code the final mandrels. With this coding, the mandrels can be stored indefinitely on a shelf and can be readily recognized when a particular mandrel is needed for a particular molding operation.

Any molding process known to the art can be used for molding objects on the mandrels of this invention. Thus, when it is desired to have the shape of the article conform to the shape of the mandrel both on the interior and exterior, vacuum bag molding can be used. Generally polyvinyl chloride bags are used for this purpose. Other molding techniques that can be used are slush molding or dipping the mandrel in resin and subsequently wrapping with the fiber glass fabric or mesh.

Any of the resins well known in the art of molding can be used with the mandrels of this invention. Thus, epoxy, polyester, silicone, di-isocyanate and other resins may be used.

Since the mandrel of this invention has a heat resistance to 300° F., it can be used in many high temperature processes. Since the solidified composition of this invention can be cut, filed and sanded, it finds utility in processes other than molding. Thus, the honeycomb structures can be dipped in the solution of this invention. Thereafter the solution can be solidified within the honeycomb structure, and the honeycomb structure subsequently cut. Then the composition can be washed from the honeycomb structure. In this way, a relatively weak honeycomb structure can be stabilized until it is cut and thereafter the stabilizing medium can easily be removed.

The solubility rate for the hardened composition of this invention is three to six minutes per pound using tap water at 130° F. to 150° F. The water absorption rate of the mandrels is negligible.

Without further elaboration, the foregoing will so fully illustrate my invention, that others may, by applying current or future knowledge, adopt the same for use under various conditions of service.

I claim:

1. A method of forming articles comprising forming a mandrel by preparing a solution in water of ammonium alum and calcium sulfate anhydrite in the amount of from 0.4 to 8 parts by weight of alum for each part by weight of anhydrite, and water in the amount of 14% to 72.5% by weight of the solution, casting the solution to form the mandrel, molding a water-insoluble hardenable material around said mandrel, permitting said material to harden and removing said mandrel by dissolving it in water.

2. The method of claim 1 wherein said hardenable material comprises a resin.

3. The method of claim 1 wherein said resin is reinforced with fiber glass.

4. The method of claim 1 wherein said hardenable material comprises concrete.

5. The method of claim 1 wherein said mandrel consists essentially of calcium sulfate anhydrite and ammonium alum.

References Cited

UNITED STATES PATENTS

| | | | |
|---|---|---|---|
| 525,202 | 8/1894 | Granjon et al. | 264—221 |
| 3,021,565 | 2/1962 | Bowman | 264—221 |
| 3,313,637 | 4/1967 | Schneider | 264—221 |
| 3,364,039 | 4/1968 | Tambussi | 264—221 |

JULIUS FROME, Primary Examiner

A. H. KOECKERT, Assistant Examiner

U.S. Cl. X.R.

264—225, 37, 317, 337